(12) United States Patent
Sasaki

(10) Patent No.: US 7,072,255 B2
(45) Date of Patent: Jul. 4, 2006

(54) INFORMATION RECORDING METHOD, INFORMATION RECORDING APPARATUS, INFORMATION RECORDING PROGRAM AND RECORDING MEDIUM STORING INFORMATION RECORDING PROGRAM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/934,730

(22) Filed: Sep. 7, 2004

(65) Prior Publication Data

US 2005/0030852 A1 Feb. 10, 2005

Related U.S. Application Data

(63) Continuation of application No. PCT/JP04/03428, filed on Mar. 15, 2004.

(30) Foreign Application Priority Data

Mar. 24, 2003 (JP) .............................. 2003-080495

(51) Int. Cl.
*G11B 7/00* (2006.01)
(52) U.S. Cl. ..................... 369/47.1; 369/275.3; 369/94
(58) Field of Classification Search ............. 369/53.24, 369/30.04, 30.1, 47.21, 30.06, 30.2, 30.11, 369/47.22, 94
See application file for complete search history.

(56) References Cited

U.S. PATENT DOCUMENTS

| | | | |
|---|---|---|---|
| 5,729,525 A | 3/1998 | Ishida et al. | |
| 5,930,225 A | 7/1999 | Ishida et al. | |
| 6,456,584 B1 | 9/2002 | Nagata et al. | |
| 2002/0024902 A1 | 2/2002 | Sasaki | |
| 2002/0114245 A1 | 8/2002 | Sasaki | |
| 2002/0159353 A1 | 10/2002 | Sasaki | |
| 2002/0172113 A1 | 11/2002 | Hirokane et al. | |
| 2003/0033475 A1 | 2/2003 | Sasaki | |
| 2003/0133369 A1 | 7/2003 | Sasaki | |
| 2003/0163638 A1 | 8/2003 | Sasaki | |
| 2003/0223338 A1 | 12/2003 | Sasaki | |
| 2004/0057366 A1 | 3/2004 | Sasaki | |
| 2004/0090886 A1 | 5/2004 | Sasaki | |
| 2004/0133739 A1 | 7/2004 | Sasaki | |
| 2004/0160875 A1 | 8/2004 | Sasaki | |
| 2004/0213117 A1 | 10/2004 | Sasaki | |
| 2005/0030869 A1* | 2/2005 | Lee ......................... | 369/53.31 |

FOREIGN PATENT DOCUMENTS

| | | |
|---|---|---|
| JP | 08-315370 | 11/1996 |
| JP | 9-69264 | 3/1997 |
| JP | 10-079126 | 3/1998 |

(Continued)

*Primary Examiner*—Nabil Hindi
*Assistant Examiner*—Crystal Jones
(74) *Attorney, Agent, or Firm*—Dickstein Shapiro Morin & Oshinsky LLP

(57) ABSTRACT

An information recording apparatus and method can prevent an information recording medium having a plurality of recording layers from being incompatible with a reproduction-only information recording medium due to an unrecorded area, which is produced by completion of recording in a middle of a data area of the recording layer. The recording layers include at least a first recording layer and a second recording layer, the first recording layer providing a reference with respect to a position of said data area in each of the recording layers. The user data is recorded in response to a recording request. After recording the user data, predetermined data is recorded in a predetermined unrecorded area in the second recording layer.

13 Claims, 8 Drawing Sheets

FOREIGN PATENT DOCUMENTS

| | | |
|---|---|---|
| JP | 2000-36130 | 2/2000 |
| JP | 2000-67511 | 3/2000 |
| JP | 2000-293947 | 10/2000 |
| JP | 2002-056543 | 2/2002 |
| JP | 2002-269831 | 9/2002 |
| JP | 2002-342926 | 11/2002 |
| JP | 2002-373426 | 12/2002 |
| JP | 2003-16648 | 1/2003 |

* cited by examiner

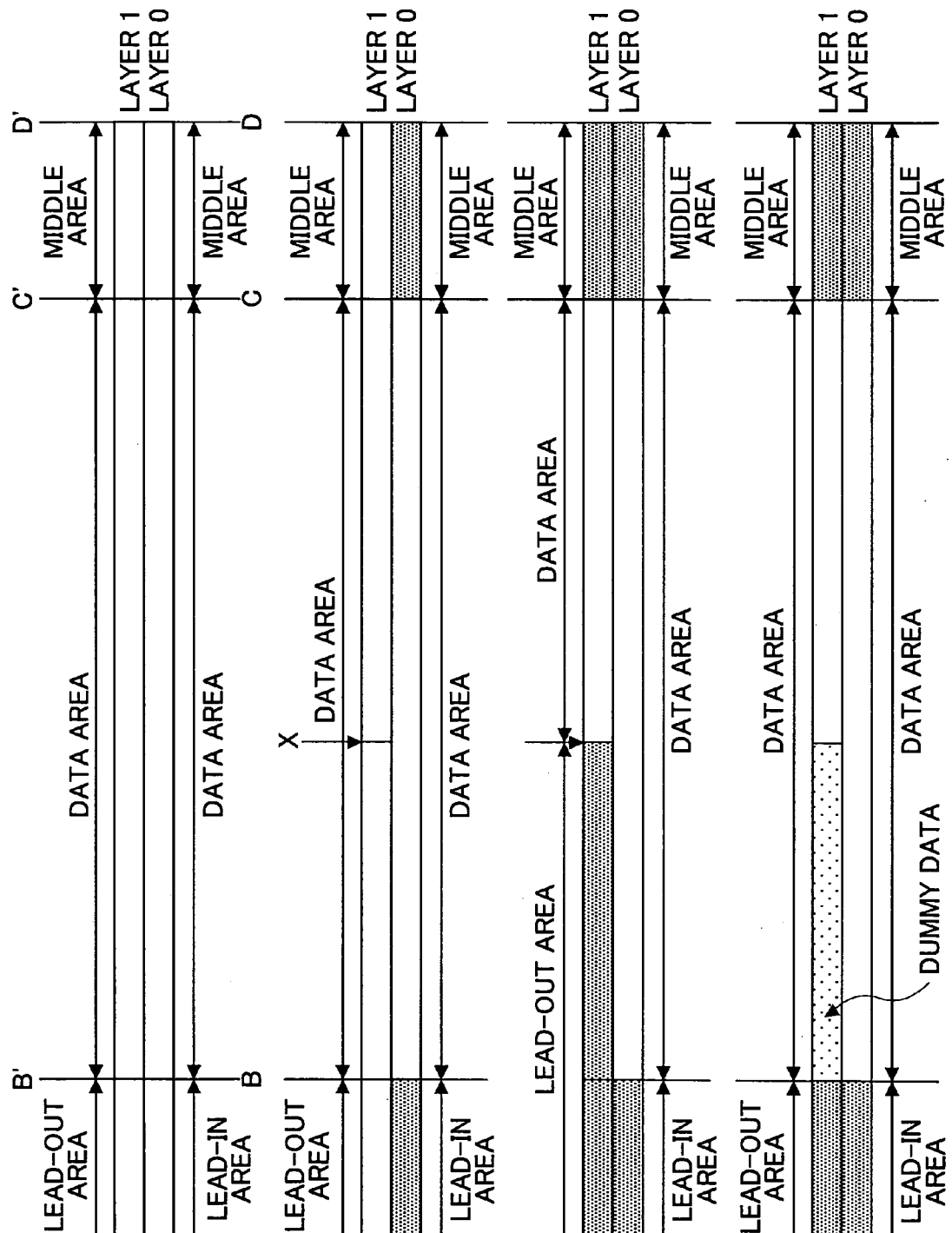

INFORMATION RECORDING METHOD, INFORMATION RECORDING APPARATUS, INFORMATION RECORDING PROGRAM AND RECORDING MEDIUM STORING INFORMATION RECORDING PROGRAM

CROSS-REFERENCE TO RELATED APPLICATION

This application is a U.S. continuation application filed under 35 U.S.C. 111(a) claiming benefit under 35 U.S.C. 120 and 365(c) of PCT application JP2004/003428, filed Mar. 15, 2004, which claims priority to application Ser. No. 2003-080495, filed in Japan on Mar. 24, 2003. The foregoing applications are hereby incorporated herein by reference.

BACKGROUND OF THE INVENTION

1. Field of the Invention

The present invention generally relates to information recording techniques and, more particularly, to an information recording apparatus and method which records information on a recordable information recording medium such as a dual-layer DVD (Digital Versatile Disc+Recordable) or the like.

2. Description of the Related Art

As recordable DVD discs, there are DVD+R which is a write-once-read-many DVD disc, DVD+RW which is a rewritable DVD disc, etc. These discs are recorded DVD discs with high reproduction compatibility with reproduction-only DVD discs. Development of a technique to increase a recording speed and recording capacity has been progressed with respect to the recordable discs.

One of the discs using such a technique is a single-sided dual-layer DVD+R disc (hereinafter, referred to as "dual-layer DVD+R") which is compatible with a single-sided dual-layer reproduction-only DVD disc. The recording capacity of the dual-layer DVD+R is 8.4 giga bytes, which is almost double the data capacity, 4.7 giga bytes, of a conventional single-layer DVD+R. Data recorded on dual-layer DVD+R can be read by a DVD-ROM drive or a DVD player that is capable of reproducing a single-sided dual-layer reproduction-only DVD disc.

Here, there are two kinds of method for the single-sided dual-layer reproduction-only DVD. One is a parallel track path method (PTP method) according to which a track of a second layer extends from an inner side to an outer side as is the same as a track of a first layer. The other is an opposite track path method (OPT method) according to which a track of a second layer extends from an outer side to an inner side. According to the PTP method, radial positions of addresses, from which data areas of the first and second layers start, are equal to each other, and each of the addresses of the data areas start from 30000H. Additionally, a lead-out area is arranged after the data area. On the other hand, according to the OTP method, the radial potion of the address at which the data area of the second layer begins is equal to the radial position of address at which the data area of the first layer ends. The physical address of the data area start position of the second layer is an address obtained by bit-inverting the data area end address of the first layer. If there is a difference in data area size between the first layer and the second layer, the difference area corresponds to the lead-out area. For example, if, in the PTP disc, an end address D1 of the data area of the first layer and an end address D2 of the data area of the second satisfy a relationship D1>D2, a difference area D1−D2 corresponds to the lead-out area. Thus, data is recorded on an area of the second layer corresponding to an area of one recording layer (first layer) where data is recorded. This is to avoid a problem, which may arise when a user reproduces data on the first layer and if a reading laser is incidentally focused on the second layer during a seeking operation to a target address, in that address information cannot be acquired if data is not recorded at the same radial position of the second layer, which may result in that data of the first layer cannot be reproduced.

Additionally, the logic address in the dual-layer DVD is continuously assigned from a start address of the data area of the first layer. Further, the logic address is continues from the data area end address of the first layer to the data area start address of the second layer. That is, when performing reproduction of data on the dual-layer DVD, the reproduction can be performed without being conscious of the recording layer.

On the other hand, when performing data recording using the dual-layer DVD+R, a user designates a recording area using a logic address similar to the reproduction operation. For this reason, if the user attempts to perform the data recording continuously, the recording is started at the data area start address of the first layer, and the recording is continued from the data area start address of the second layer after completion of the recording to the data area end address of the first layer.

Thus, it is possible to record without a user being conscious of a recording layer also in recording the dual-layer DVD+R. For this reason, there may be a case where the data recording ends in the middle of the data area of the second layer or ends without recording on the second layer. For example, if the data recording is completed in the middle of the data area of the second layer, that is, if the data recording is completed in a state where an unrecorded area is present, and if the unrecorded area remains in the data area of the second layer, the disc layout is not compatible with a reproduction-only dual-layer DVD disc. Additionally, for example, there may be a problem, which may arise when reproducing data on the first layer and if a reading laser is incidentally focused on the second layer during a seeking operation to a target address, in that address information cannot be acquired if data is not recorded at the same radial position of the second layer, which may result in that data of the first layer cannot be reproduced. Such a problem may also arise in a case where data recording is ended without recording on the second layer.

SUMMARY OF THE INVENTION

It is a general object of the present invention to provide an improved and useful information recording apparatus and method in which the above-mentioned problems area eliminated.

A more specific object of the present invention is to provide an information recording apparatus and method which prevents an information recording medium having a plurality of recording layers from being incompatible with a reproduction-only information recording medium due to an unrecorded area, which is produced by completion of recording in a middle of a data area of the recording layer.

In order to achieve the above-mentioned objects, there is provided according to the present invention an information recording method for recording information on an information recording medium having a plurality of recording layers each having a data area to record user data, the recording layers including at least a first recording layer and a second recording layer, the first recording layer providing a reference with respect to a position of the data area in each of the recording layers, the information recording method comprising: recording the user data in response to a recording request; and after recording the user data, recording predetermined data in a predetermined unrecorded area in the second recording layer.

Accordingly, when the user data recording is completed in the middle of the data area of the second recording layer, the predetermined data (for example, the lead-out data or the dummy data having user data attribute) is recorded in the unrecorded area generated in the second recording layer. Additionally, when the user date recording is completed in the middle of the data area of the first recording layer, the lead-out area or the middle area provided subsequent to the user data recording area in the first recording layer. Consequently, a determination is made that the data area of the second recording layer is an area defined by addresses corresponding to the start address and the end address of the data area of the first recording layer. That is, the range of the data area of the second recording layer is determined by determining the data area of the first recording layer, and the predetermined data (for example, the lead-out data or the dummy data having user data attribute) is recorded in the predetermined unrecorded area subsequent to the data area in the second recording layer. According to the above-mentioned recording method, the predetermined unrecorded area is filled with data even when the user data recording is completed in the middle of the data area. Additionally, if a read laser is incidentally focused on the second recording layer during a seek operation to a target address when the user reproduces the data recording on the first recording layer, a problem that the data of the first recording layer cannot be reproduced due to that data is not recorded at the same radial position of second recording layer.

In the above-mentioned information recording method, the predetermined data recorded in the predetermined unrecorded area is preferably lead-out data. In such as case, the lead-out data, which is to be recorded after the data area, is used as the predetermined data to be filled in the predetermined unrecorded area.

In the information recording method according to the present invention, it is preferable that the predetermined unrecorded is subsequent to a user data recorded area where the user data has been recorded. In such as case, the entire predetermined unrecorded area up to the lead-out area may be filled with the lead-out data, which is originally used to define an end address of the recording layer.

Additionally, in the above-mentioned information recording method, the information recording medium may be recordable according to a parallel track path method, and the predetermined unrecorded area may be defined as an area from an end address of the user data recorded area to an address of the second recording layer corresponding to the same radial position with an end address of a lead-out area of the first recording layer. Accordingly, the unrecorded area to be filed with the lead-out data as the predetermined data can be defined when the parallel track path method is used.

Additionally, in the information recording method according to the present invention, the information recording medium may be recordable according to an opposite track path method, and the predetermined unrecorded area may be defined as an area from an end address of the user data recorded area to an address of the second recording layer corresponding to the same radial position with a start address of a lead-in area of the first recording layer. Accordingly, the unrecorded area to be filed with the lead-out data as the predetermined data can be defined when the opposite track path method is used.

Additionally, in the information recording method according to the present invention, the predetermined data recorded in the predetermined unrecorded area may be dummy data having user data attribute. In this case, by using the dummy data having user data attribute as the predetermined data which fills the predetermined non-recorded area, the predetermined area is not limited to the lead-out data, which gives flexibility in selection of the predetermined data. Additionally, the lead-out data can be used for the original purpose to define the an end address of the recording layer, thereby achieving a state close to a state of normal user data recording including dummy data.

In the above-mentioned information recording method, it is preferable that the predetermined unrecorded area is the data area of the second recording layer except for a user data recorded area where the user data has been recorded. In this case, by recording dummy data in the area except for the user data recorded area in the data area of the second recording layer, the lead-out data can be used for the original purpose to define the an end address of the recording layer, thereby achieving a state closest to a state of normal user data recording including dummy data.

In the above-mentioned information recording method, the information recording medium may be recordable according to a parallel track path method, and the predetermined unrecorded area may be defined as an area from an end address of the user data recorded area to an address of the second recording layer corresponding to the same radial position with a start address of a lead-out area of the first recording layer. In this case, the unrecorded area to be filed with the dummy data as the predetermined data can be defined when the parallel track path method is used.

In the above-mentioned information recording method, the information recording medium may be recordable according to an opposite track path method, and the predetermined unrecorded area may be defined as an area from an end address of the user data recorded area to an address of the second recording layer corresponding to the same radial position with an end address of a lead-in area of the first recording layer. Accordingly, the unrecorded area to be filed with the dummy data as the predetermined data can be defined when the opposite track path method is used.

In the above-mentioned information recording method, it is preferable that the lead-out data is recorded in an area subsequent to the predetermined unrecorded area. In this case, by recording dummy data in the area except for the user data recorded area in the data area of the second recording area, and also recording lead-out data in the area subsequent to the area where the dummy data is recorded, the lead-out can be used for the original purpose to define an end address of the recording layer, thereby achieving a state closest to a state of normal user data recording including dummy data.

In the above-mentioned information recording method, the predetermined data recorded in the predetermined unrecorded area may be dummy data having user data attribute and lead-out data. In this case, the dummy data having user data attribute and the lead-out data are combined and used to the predetermined data to fill the predetermined unrecorded area.

In the above-mentioned information recording method, the dummy data having user data attribute may be all-zero data. That is, zero-data, which is general and simple data, is used for the dummy data.

In the above-mentioned information recording method, the information recording medium may be compliant with a DVD+R standard. That is, the information recording method according to the present invention is preferably applicable to an information recording medium compliant with a DVD−R that may cause a problem in compatibility due to an unrecorded area existing in a reproduction-only information recording medium having a plurality of recording layers.

Additionally, there is provided according to another aspect of the present invention an information recording method for recording information on an information recording medium having a plurality of recording layers including at least a first layer and a second layer each having a data area for recording user data, the information recording medium being recordable according to an opposite track path method, the information recording method comprising: determining whether a recording completion position at which recording of the user data is completed is within the first layer; and recording lead-out data, when the position is determined to be within the first layer, in an area from a position of the second layer corresponding to the same radial position with the recording completion position to an inner side.

In the above-mentioned information recording method, the information recording medium may be a write-once-read-many optical disc. Additionally, the information recording medium may be a rewritable optical disc. Further, the information recording method may further comprise: determining whether an address of the recording completion position is an address of the first layer; and determining that recording is completed within the first layer if the address of the recording completion position is the address of the first layer.

Additionally, there is provided according to another aspect of the present invention an information recording method for recording information on an information recording medium having a plurality of recording layers including at least a first layer and a second layer each having a data area for recording user data, the information recording medium being recordable according to an opposite track path method, the information recording method comprising: determining whether a recording completion position at which recording of the user data is completed is within the first layer; recording a middle area immediately after the recording completion position, when the position is determined to be within the first layer; and maintaining an area on an outer side of the middle area unrecorded.

In the above-mentioned information recording method, the information recording medium may be a write-once-read-many optical disc. Additionally, the information recording medium may be a rewritable optical disc. Further, the information recording method may further comprise: determining whether an address of the recording completion position is an address of the first layer; and determining that recording is completed within the first layer if the address of the recording completion position is the address of the first layer.

Further, there is provided according to another aspect of the present invention an information recording method for recording information on an information recording medium having a plurality of recording layers including at least a first layer and a second layer each having a data area for recording user data, the information recording medium being recordable according to an opposite track path method, the information recording method comprising: determining whether a recording completion position at which recording of the user data is completed is within the first layer; recording lead-out data, when the position is determined to be within the first layer, in an area from a position of the second layer corresponding to the same radial position with the recording completion position to an inner side; recording a middle area immediately after the recording completion position, when the position is determined to be within the first layer; and maintaining an area on an outer side of the middle area unrecorded.

The above mentioned invention is applicable to an information recording apparatus, an information recording program and a recording medium storing such an information recording program, which may provide the same effects.

Other objects, features and advantages of the present invention will become more apparent from following detailed description when read in conjunction with the accompanying drawings.

BRIEF DESCRIPTION OF THE DRAWINGS

FIG. 4A is an illustration showing a layout of the dual-layer DVD+R according to an OTP method in an unrecorded state;

FIG. 4B is an illustration showing a layout of the dual-layer DVD+R according to the OTP method when user data recording is completed at a position of an address X of a second layer (layer 1);

FIGS. 4C and 4D are illustrations showing a layout of the dual-layer DVD+R according to the OTP method when user data recording is completed in a middle of the layer 1 in recording according to the present invention;

DETAILED DESCRIPTION OF THE PREFERRED EMBODIMENTS

Figure 1:
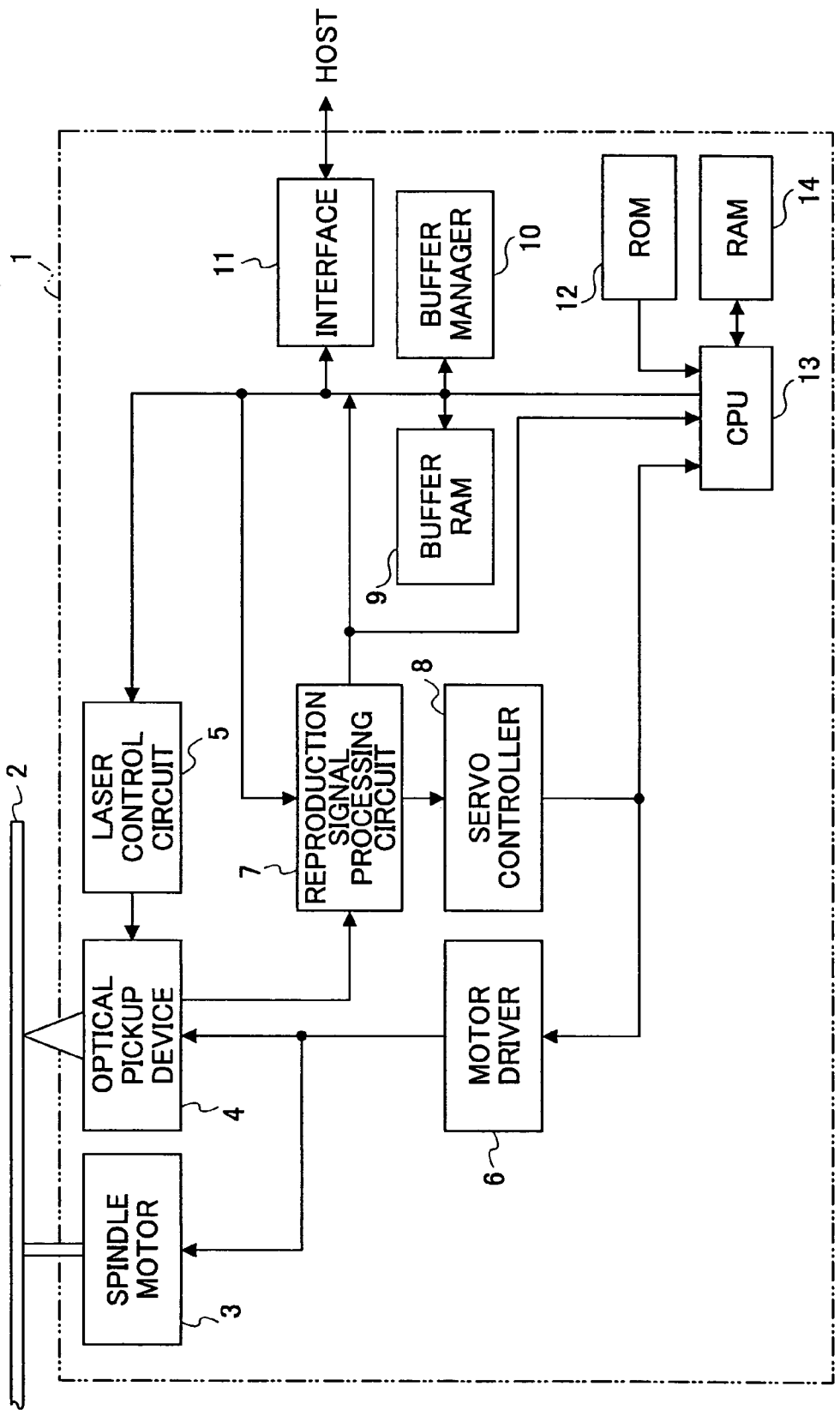
FIG. 1 is a block diagram showing an outline structure of an optical disk apparatus according to a first embodiment of the present invention.

A description will be given, with reference to the drawings, of an information recording apparatus according to the present invention. FIG. 1 is a block diagram showing an outline structure of an optical disk apparatus 1 as an information recording apparatus according to an embodiment of the present invention.

The optical disk apparatus 1 comprises a spindle motor for rotating an optical disk 2 as an information recording medium, an optical pickup 4, a laser control circuit 5, a motor driver 6, a reproduction signal processing circuit 7, a servo controller 8, a buffer random access memory (buffer RAM) 9, a buffer manager 10, an interface 11, a read only memory (ROM) 12, a central processing unit (CPU) 13 and a random access memory (RAM) 14. It should be noted that arrows in FIG. 1 indicate a part of flow of signals and information, and do not indicate all connection relationship between the blocks.

The optical disc 2 used in the present embodiment is a dual-layer DVD+R conforming to a standard of DVD+R.

The optical pickup apparatus 4 includes a semiconductor laser as a light source, an optical system having an objective lens, a light-receiving device and a drive system. The objective lens of the optical system focuses a laser light projected from the semiconductor laser on a recording surface of the optical disk 2 and leads the laser beam reflected by the recording surface to a predetermined light-receiving position. The light-receiving device is positioned at the light-receiving position so as to receive the laser light exit from the objective lens. The drive system includes a focusing actuator, a tracking actuator, a seek motor, etc (not shown in the figure). The light-receiving device outputs a current (current signal) corresponding to an amount of received light to a reproduction signal processing circuit 7.

The servo controller 8 produces a control signal that controls the tracking actuator of the optical pickup device 4 based on a track error signal, and also produces a control signal that controls the focusing actuator of the optical pickup device 4 based on a focal error signal. The servo controller 8 outputs these control signals to the motor driver 6.

The motor driver 6 drives the focusing actuator and the tracking actuator of the optical pickup device 4 based on the control signals from the servo controller 8. Additionally, based on directions of CPU 13, the motor driver 6 controls the spindle motor 3 so that a linear velocity of the optical disc 2 is constant. Further, based on directions of CPU 13, the motor driver 6 drives the seek motor for the optical pickup devices 4 so as to move the optical pickup device 4 in a radial direction toward a target track of the optical disc 2.

The interface 11 is a bidirectional communication interface with a host (for example, a personal computer PC), which is an external apparatus.

The CPU 13 constitutes a microcomputer (computer) together with the ROM 12 and the RAM 14. The ROM 12, which also serves as a memory medium, stores programs including an information recording program described by codes readable by the CPU 13. The CPU 13 controls each of the above-mentioned parts in accordance with the programs stored in the ROM 12, and temporarily stores data necessary for control in the RAM 14. It should be noted that when a power of the optical disk apparatus 1 is turned on, the programs stored in the ROM 12 are loaded (installed) to a main memory (not shown in the figure) of the CPU 13.

The present embodiment relates to a record processing control when dual-layer DVD+R, which is the target optical disc 2, is mounted to the optical disk apparatus 1 and there is a record request for the user data from a host side. Before explanation of the record processing control, a description will be given first of a layout of a reproduction-only DVD disc, which is a premise of the specification of DVD+R.

Figure 2A:
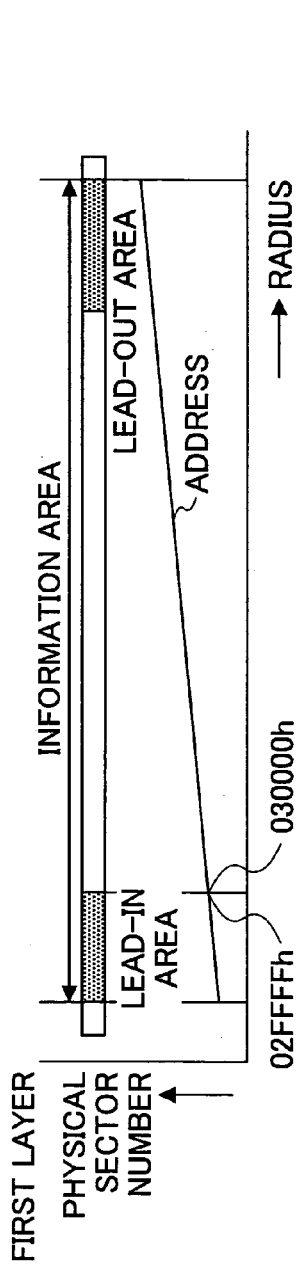
FIGS. 2A, 2B and 2C are illustrations showing a layout of a reproduction-only DVD disc.
Figure 2B:
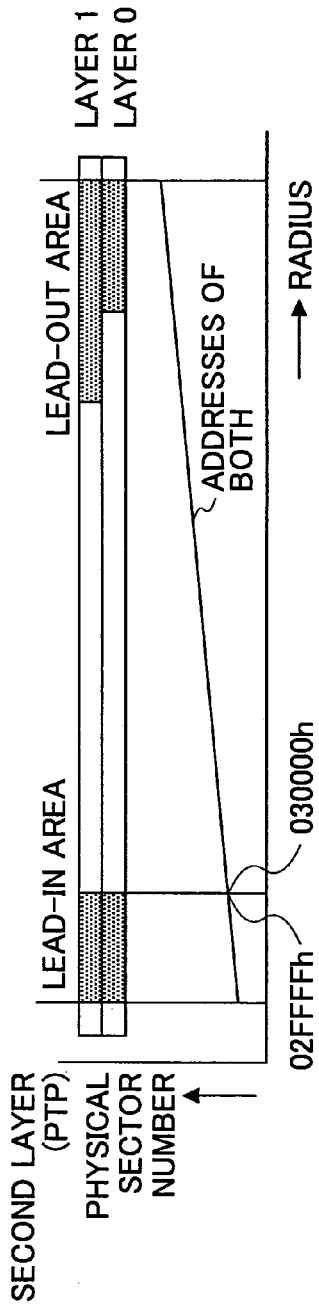
Figure 2C:
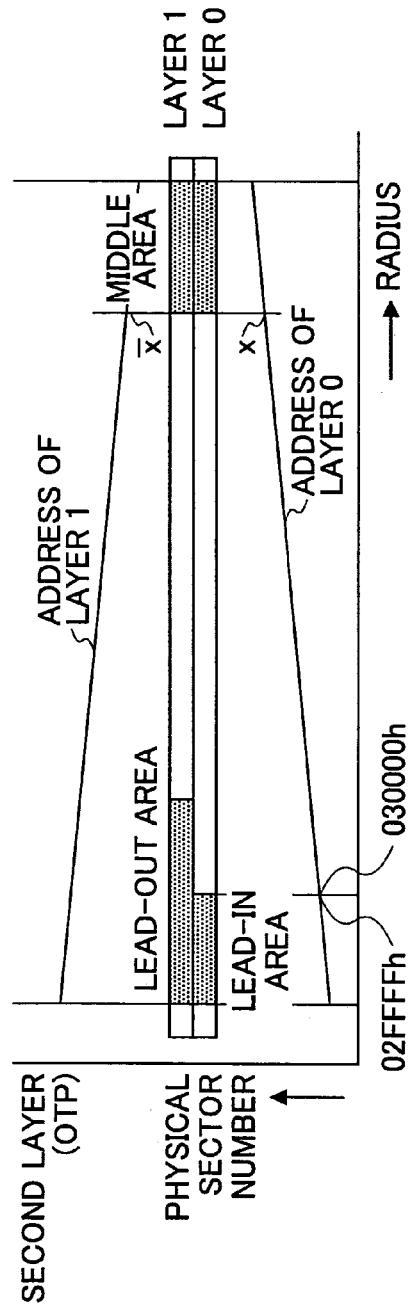

FIGS. 2A, 2B and 2C are illustrations showing a layout of the reproduction-only DVD disc. FIG. 2A shows a single-sided single-layer disc (hereinafter referred to as single-layer disc); FIG. 2B shows a single-sided dual-layer disc according to the PTP method (hereinafter, referred to as PTP disc); and FIG. 2C shows a single-sided dual-layer disc according to the OTP method (hereinafter, referred to as OTP disc).

A DVD disc comprises fundamentally an information area, which includes a lead-in area, a data area and a lead-out area. The single-layer disc and the PTP disc have the information area for each recording layer. The OTP disc includes one information area, and has a middle area behind the data area in each recording layer. Reproduction of data of the layers 0 and 1 of the single-layer disc and the PTP disc is performed toward the outer side from the inner side, while reproduction of data of the layer 1 is performed from the outer side toward the inner side. Consecutive physical addresses (physical sector numbers) are assigned from the lead-in area to the lead-out area of each recording layer of the single-layer disc and the PTP disc. Although consecutive physical addresses are assigned to the lead-in area to a middle area of the layer 0, bit-inverted physical addresses of the layer 0 are assigned as physical addresses of the layer 1 and the physical address is increases from the middle area to the lead-out area. Accordingly, the start address of the data area in the layer 1 is equal to the bit-inverted end address of the layer 0.

As shown in FIG. 2B, the lead-in area start and end addresses, the start address of the data area and the end address of the lead-out area in the PTP disc are located at the same radial position, and the start address of the lead-out area, that is, the end address of the data area may be different radial position for in each recording layer. When the end address of the data area is different, an area corresponding to the difference is recorded with the lead-out data.

On the other hand, as shown in FIG. 2C, in the case of the OTP disc, the start address of the lead-in area and the end address of the lead-out area, the data area end address of the layer 0 and the data area start address of the layer 1, and the start and end addresses of the middle area of each recording layer are located at the same radial position, and the data area start address of the layer 0 and the data end address of the layer 1 do not always match with each other. Also in the OTP disc, the difference area is recorded with the lead-out data.

A description will now be given, with reference to FIGS. 3A through 3H, of an information recording method according to the present invention applicable to the dual-layer DVD+R (optical disc 2) according to the PTP method based on the layout of the reproduction-only DVD disc mentioned above.

Figure 3A:
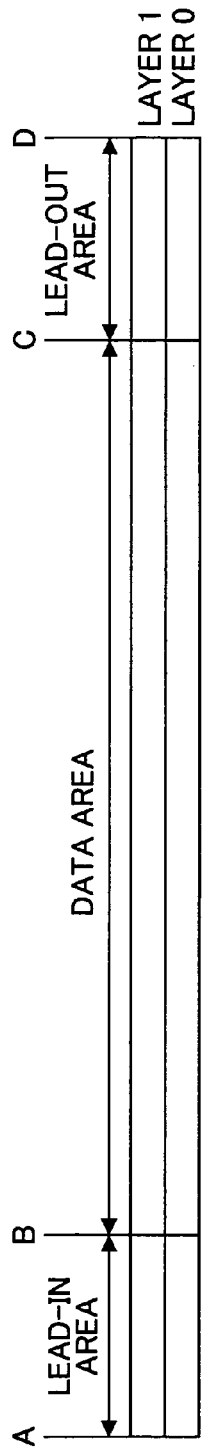
FIG. 3A is an illustration showing a layout of a dual-layer DVD+R according to a PTP method in an unrecorded state.

FIG. 3A shows a layout of the dual-layer DVD+R in an unrecorded state where there is no data recorded. A lead-in area, a data area and a lead-out area exist in each of the layer 0, which is the first recording layer, and the layer 1, which is the second recording layer. In FIG. 3A, A indicates a lead-in start address, B indicates a data area start address, C indicates a lead-out area start address, and D indicates a lead-out area end address. Addresses A through D in each of the recording layers (layers 0 and 1) are located at the same radial position of the optical disc 2.

Figure 3B:
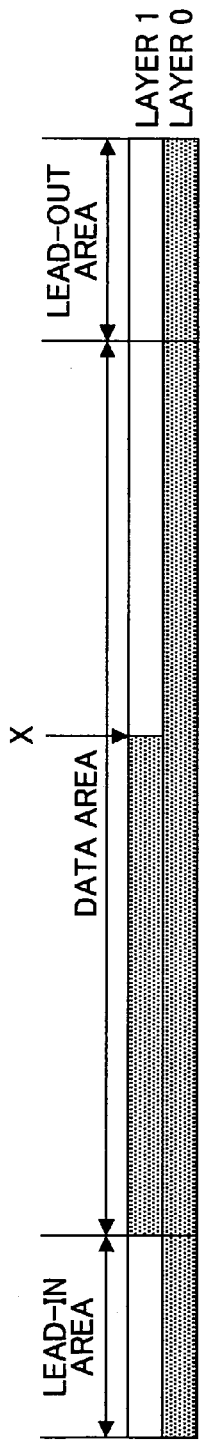
FIG. 3B is an illustration showing a layout of a dual-layer DVD+R according to the PTP method in a state where user data recording is completed at an address X of a second layer (layer 1)
Figure 3C:
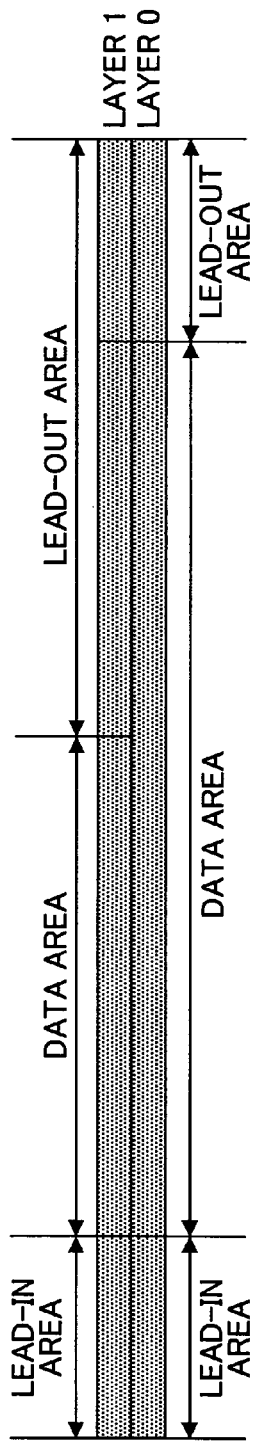
FIGS. 3C and 3D are illustrations showing a layout of the dual-layer DVD+R according to the PTP method when the user data recording is completed in a middle of the layer 1 in a recording according to the present invention.
Figure 3D:
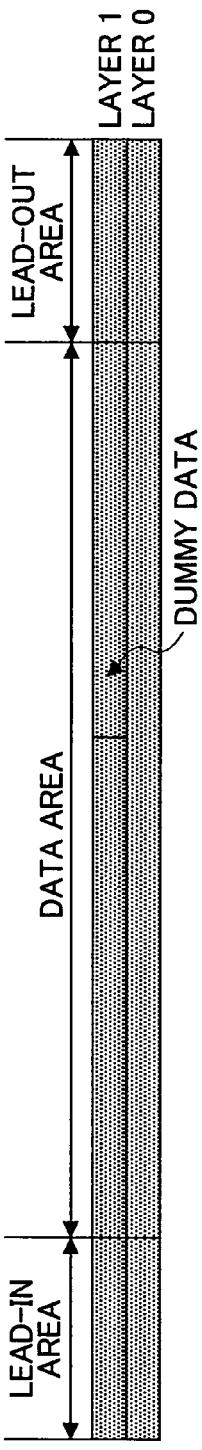

FIG. 3B shows a layout of the dual-layer DVD+R when user data recording is completed at a position of an address X of the second layer (layer 1). FIGS. 3C and 3D show a layout of the dual-layer DVD+R when user data recording is completed in the middle of the layer 1 in the recording according to the information recording method of the present invention.

As shown in FIG. 3C, when user data recording is completed in the middle of the second layer (layer 1), according to an embodiment of the present invention, an unrecorded recording area after the user data recording area is recorded with lead-out data. That is, the area from the address X to the address D of the layer 1 is regarded as a predetermined unrecorded area and is recorded with predetermined data (=lead-out data). Therefore, in the layer 0, an area from the address A to the address B is a lead-in area, an area from the address B to the address C is a data area, and an area from the address C to the address D is a lead-out area. On the other hand, in the layer 1, an area from the address A to the address B is a lead-in area, an area from the address B to the address X is a data area, and an area from the address X to the address D is a lead-out area. Consequently, the disc layout is the same as that of the single-sided dual-layer reproduction-only DVD-ROM. Therefore, when user data recording is completed in the middle of the data area of the second layer (layer 1), the compatibility with the single-sided dual-layer DVD-ROM can be maintained.

Additionally, according to another embodiment, when the user data recording is completed in the middle of the data area of the second layer (layer 1), as shown in FIG. 3D, an area excluding the user data recorded area, on which the user data recording was performed, in the data area of the second recording layer (layer 1) concerned is recorded with dummy data having data attribute such as all-zero data. That is, the area from the address X to the address C of the layer 1 is regarded as a predetermined unrecorded area and is recorded with predetermined data (=dummy data of data attribute). At this time, the lead-out data may be recorded in the lead-out area (addresses C to D) of the layer 1. Therefore, in both the layers 0 and 1, an area from the address A to the address B is a lead-in area, an area from the address B to the address C is a data area and an area from the address C to the address D is a lead-out area. Consequently, the disc layout is the same as that of the single-sided dual-layer reproduction-only DVD-ROM. Therefore, eve when user data recording is completed in the middle of the data area of the second layer (layer 1), the compatibility with the single-sided dual-layer reproduction-only DVD-ROM can be maintained without problems.

A description will now be given of a case where user data recording is completed in the middle of the data area of the layer 0.

Figure 3E:
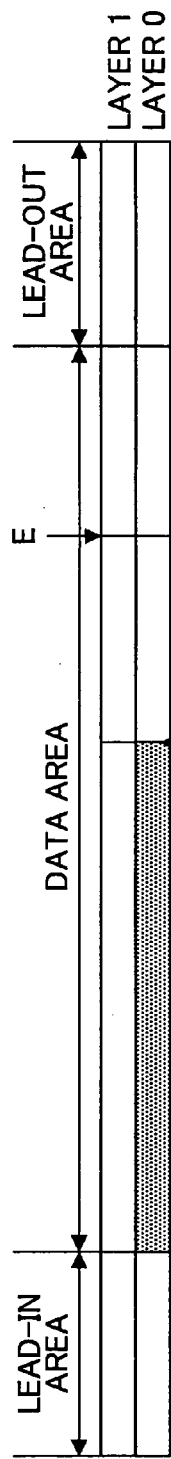
FIG. 3E is an illustration showing a layout of the dual-layer DVD+R according to the PTP method when user data recording is completed at a position of an address Y of a first layer (layer 0)
Figure 3F:
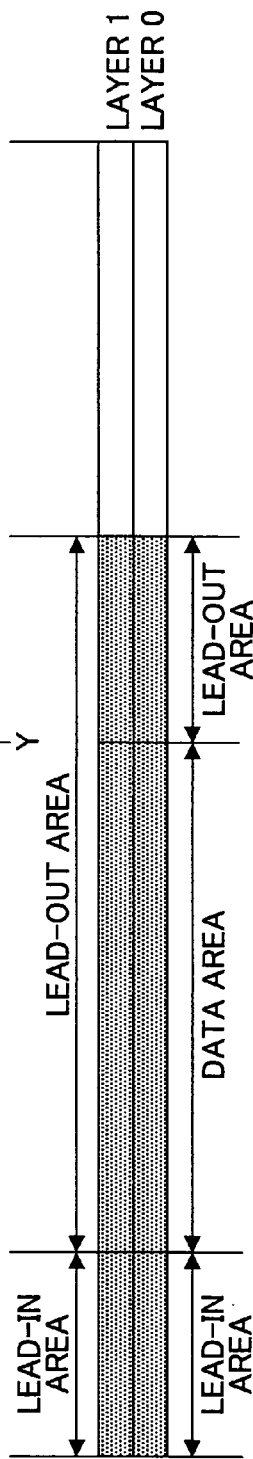
FIGS. 3F, 3H and 3G are illustrations showing a layout of the dual-layer DVD+R according to the PTP method when user data recording is completed in a middle of the layer 0 in a recording according to the present invention.
Figure 3G:
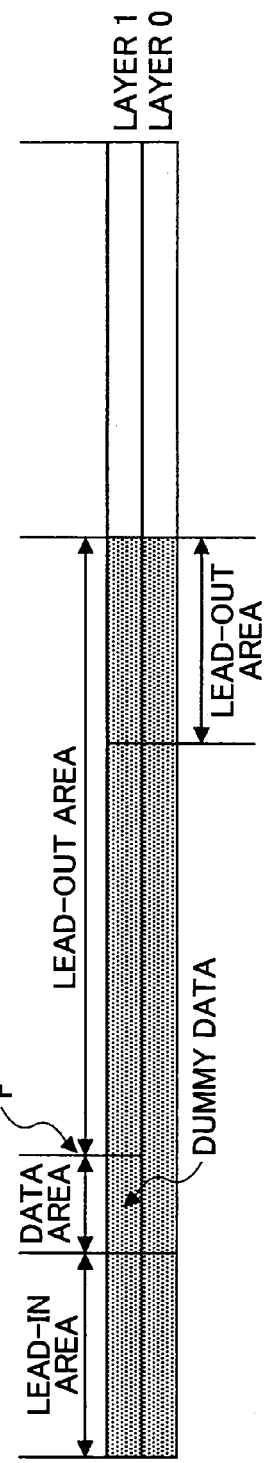
Figure 3H:
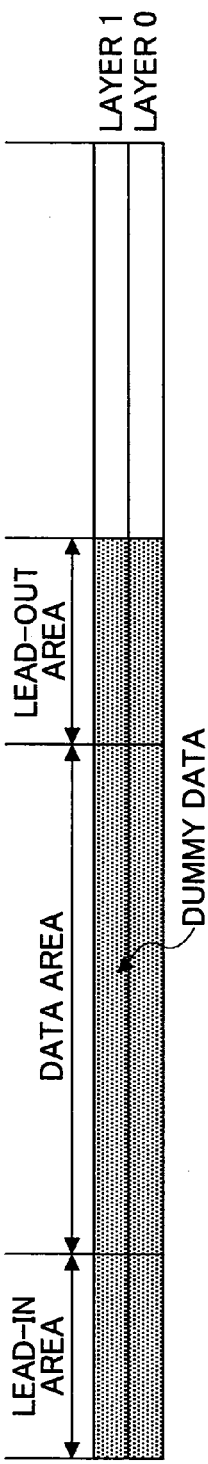

FIG. 3E shows a layout of the dual-layer DVD+R when user data recording is completed at the position of the address Y of the layer 0. FIGS. 3F, 3H and 3G show a layout of the dual-layer DVD+R when user data recording is completed in the middle of the layer 0 in the recording according to the recording method of the present invention.

When the user data recording is completed during recording on the first layer (layer 0) layer, the lead-out area is an area from Y to E in the figure. Consequently, the data area of the layer 1 is an area from B to Y, and the lead-out area of the layer 1 is an area from Y to E. That is, the layer 0 is the reference recording area that determines position and range of the data area. Accordingly, the position and range of the data area of the layer 1 is determined by determining the data area of the layer 0.

Thus, as one of embodiments of the present invention, when the user data recording is completed as mentioned above, an unrecorded area after the user data recorded area is recorded with lead-out data as shown in FIG. 3F. In this example, since there is no user data recorded on the data area of the layer 1 at all, the area from the start address B to the address E of the data area of the layer 1 is regarded as an unrecorded area and predetermined data (=lead-out data) is recorded. Therefore, in the layer 0, an area from the address A to the address B is the data area, and an area from the address B to the address Y is the lead-out area. On the other hand, in the layer 1, an area from the address A to the address B is the lead-in area and an area from the address B to the address E is the lead-out area. Consequently, when the user data recording is completed without recording user data on the layer 1, data is recorded as lead-out data. Therefore, when reproducing data on the first layer (layer 0), if the read laser is incidentally focused on the second layer (layer 1) during a seek operation to a target address, a problem that data on the first layer cannot be reproduced can be avoided since use data is not recorded at the same radial position on the second layer.

FIG. 3G shows an information recording method according to another embodiment of the present invention. In the information recording method shown in FIG. 3G, dummy data of user data attribute and lead-out are recorded on a predetermined unrecorded area. When no user data is recorded on the second layer, the lead out may be recorded after recording the dummy data of user data attribute on a part of an unrecorded area. Here, when recording the dummy data of user data attribute to the address F, the lead-out is recorded from the address F to the address E. Therefore, in the layer 0, an area from the address A to the address B is the lead-in area, an area from the address B to the address Y is the data area, and an area from the address B to the address Y is the lead-out area. On the other hand, in the layer 1, an area from the address A to the address B is the lead-in area, an area from the address B to the address F is the data area, and an area from the address F to the address E is the lead-out area. Consequently, it becomes the same disc layout as single-sided dual-layer DVD-ROM, and, thus the compatibility with a dual-layer DVD-ROM (PTP) can be maintained even when the user data recording is ended in the middle of the data area of the second layer.

Moreover, in yet another embodiment of the present invention, if the user data recording is completed as mentioned above, the dummy data having data attribute is recorded on the data area of the recording layer concerned except for the user data recorded area where the user data was recorded. In this example, since the user data is not recorded on the data area of the layer 1 at all, an area from the start address B to the address Y of the data area of the layer 1 is regarded as a predetermined unrecorded area and is recorded with predetermined data (=dummy data having data attribute). At this time, the lead-out may be recorded on the lead-out area (from the address Y to the address E) of the layer 1. Therefore, in both the layer 0 and the layer 1, the area from the address A to the address B is the lead-in area, the area from the address B to the address Y is the data area, and the area from the address Y to the address E is the lead-out area. Consequently, it becomes the same disc layout as a single-sided reproduction-only DVD-ROM, and, thus, the compatibility with the dual-layer DVD-ROM can be maintained even when the user data recording is completed in the middle of the data area of the first layer (layer 0).

A description will now be given, with reference to FIGS. 4A through 4H, of an information recording method according to the present invention that is applicable to a dual-layer DVD-R (the optical disc 2) according the OTP method based on the layout of the reproduction-only DVD disc.

FIG. 4A shows a layout of a dual-layer DVD+R according to the OTP method in an unrecorded state where data is not recorded at all. In the layer 0 which is the first recording layer, there are a lead-in area, a data area and a middle area arranged in that order from the inner side of the disc. In the layer 1, there are a middle area, a data area and a lead-out area arranged in that order from the outer side of the disc. In the figure, A indicates a start address of the lead-in area, B indicates a start address of the data area of the layer 0, C indicates a start address of the middle area of the layer 0, and D indicates an end address of the middle area of the layer 0. Moreover, D' indicates a start address of the middle area of the layer 1, C' indicates a start address of the data area of the layer 1, B' indicates a start address of the lead-out area, and A' indicates an end address of the lead-out area. A and A', B and B', C and C', and D and D' are bit-inverted values, respectively, and located at the same radial position of the optical disc 2.

FIG. 4B shows a layout of a dual-layer DVD+R according to the OTP method when user data recording is completed at a position of an address X of the second layer (layer 1). Additionally, FIGS. 4C and 4D show a layout of dual-layer DVD+R according to the OTP method when user data recording is completed in the middle of the data area of the layer 1 during a recording operation according to the recording method of the present invention.

As shown in FIG. 4B, when user data recording is completed in the middle of the data area of the layer 1, the lead-out is recorded on an unrecorded area after the area where the user data was recorded as shown in FIG. 4C according to an embodiment of the present invention. That is, the area from the address X to the address A' is regarded as a predetermined unrecorded area and is recorded with predetermined data (=lead-out). Therefore, the area from the address A to the address B is the lead-in area, the area from the address B to the address C is the data area of the layer 0, the area from the address D7 to the address C' is the middle area of the layer 1, the area from the address C' to the address X is the data area of the layer 1, and the area from the address X to the address A' is the lead-out area. Consequently, it becomes the same disc layout as a single-sided dual-layer reproduction-only DVD-ROM. Therefore, even when user data recording is completed in the middle of the data area of the second layer (layer 1), the compatibility with a single-sided dual-layer reproduction-only DVD-ROM can be maintained.

Moreover, according to another embodiment of the present invention, when the user data recording is completed in the middle of the data area of the layer 1, dummy data having data attribute, such as all-zero data, is recorded on an area of the data area of the second recording layer (layer 1) except for the user data recorded area where the user data was recorded, as shown in FIG. 4D. That is, the area from the address X to the address B' as a predetermined non-recorded area is recorded with the predetermined data (=dummy data having data attribute). At this time, the lead-out data may be recorded on the lead-out area (from the address B' to the address A'). Therefore, an area from the address A to the address B is the lead-in area, an area from the address B to the address C is the data area of the layer 0, an area from the address C to the address D is the middle area of the layer 0, the area from the address D' to the address C' is the middle area of the layer 1, an area from the address C' to the address B' is the data area of the layer 1, and an area from the address B' to the address A' is the lead-out area. Consequently, it becomes the same disc layout as a single-sided dual-layer reproduction-only DVD-ROM. Therefore, when the user data recording is completed in the middle of the data area of the second layer (layer 1), the compatibility with the single-sided dual-layer reproduction-only DVD-ROM can be maintained.

Figure 4E:
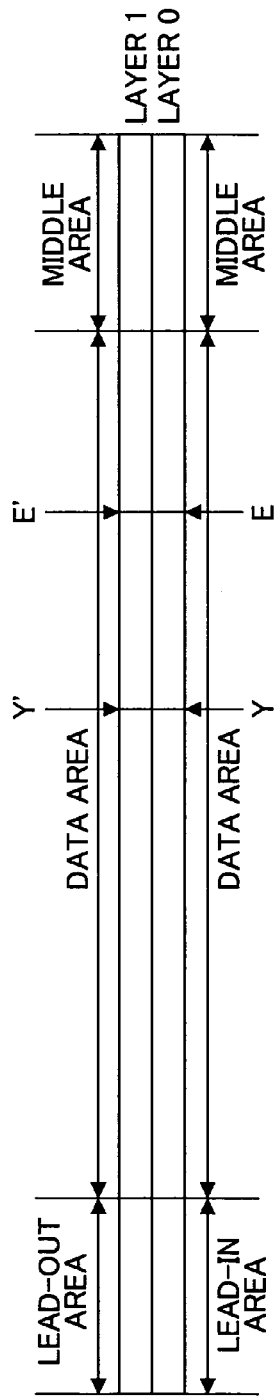
FIG. 4E is an illustration showing a layout of the dual-layer DVD+R according to the OTP method when user data recording is completed at a position of an address Y of the first layer (layer 0)
Figure 4F:
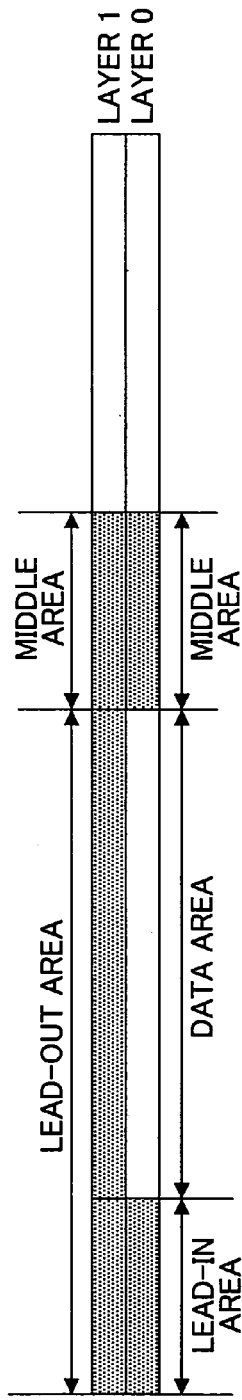
FIGS. 4F, 4H and 4G are illustrations showing a layout of the dual-layer DVD+R according to the OTP method when user data recording is completed in a middle of the layer 0 in recording according to the present invention.

FIG. 4E shows a layout of a dual-layer DVD+R according to the OTP method when user data recording is completed at a position of an address Y of the first layer (layer 0). Moreover, FIG. 4E through 4H show a layout of the dual-layer DVD+R according to the OTP method when user data recording is completed in the middle of the layer 0 (first recording layer) during a recording operation according to the recording method of the present invention.

As shown in FIG. 4E, when user data recording is completed during recording on the first layer (layer 0), an area from the address Y to the address E becomes the middle area of the layer 0. Consequently, the middle area of the second layer (layer 1) is an area from the address E' to the address Y', and the data area of the layer 1 is an area from the address Y' to the address B'. That is, the range of the data area of the layer 1 is determined by determining the data area of the layer 0.

Thus, according to one embodiment of the present invention, the unrecorded area after the user data recorded area is recorded with lead-out data, as shown in FIG. 4. In this example, since user data is not recorded on the data area of the layer 1 at all, an area from the start address Y' to the address A' of the data area of the layer 1 as a predetermined unrecorded area is recorded with predetermined dummy data (=lead out). Therefore, an area form the address A to the address B is the lead-in area, an area from the address B to the address Y is the data area of the layer 0, an area from the address Y to the address E is the middle area of the layer 0, an area from the address E' to the address Y' is the middle layer of the layer 1, and an area from the address Y' to the address A' is the lead-out area. Consequently, when user data recording is completed without recording user data on the second layer (layer 1), data is recorded on the non-recorded area as a lead-out. Therefore, even if a read laser is incidentally focused on the second layer during a seeking operation to a target address when reproducing data on the first layer (layer 0), it is possible to avoid a problem in that the data on the first layer cannot be reproduced due to data not recorded on the second layer at the same radial position can be avoided.

Figure 4G:
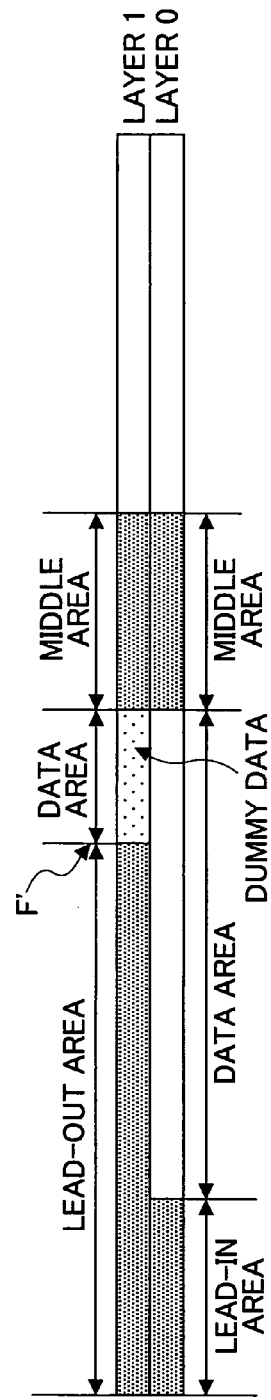

FIG. 4G shows a information recording method according to another embodiment of the present invention. According to the information recording method shown in FIG. 4G, dummy data having data attribute and the lead-out are recorded on a predetermined unrecorded area. When user data is not recorded on the second layer, after recording a part of an unrecorded area may be recorded with dummy data having user data attribute, lead-out may be recorded on the remaining part of the area. Here, when recording the dummy data having user data attribute to the address F', the lead-out is recorded on an area from the address F' to the address A'. Accordingly, an area from the address A to the address B is the lead-in area, an area from the address B to the address Y is the data area of the layer 0, an area from the address Y to the address E is the middle area of the layer 0, an area from the address E' to the address Y' is the middle area of the layer 1, an area from the address Y' to the address F' is the data area of the layer 1, and an area from the address F' to the address A' is the lead-out area. Consequently, it becomes the same disc layout as a single-sided dual-layer reproduction-only DVD-ROM. Therefore, even when user data recording is completed in the middle of the data area of the second layer, the compatibility with the single-sided dual-layer reproduction-only DVD-ROM can be maintained.

Figure 4H:
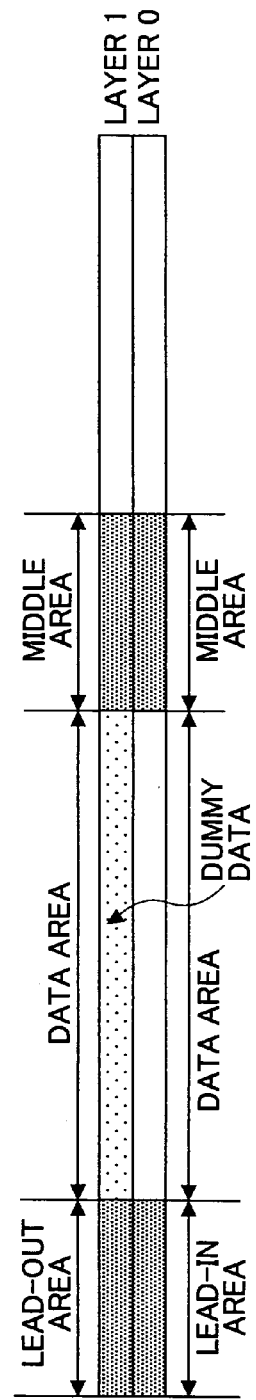

Moreover, according to further embodiment of the present invention, when the user data recording is completed as mentioned above, a part of the data area of the recording layer concerned except for the user data recorded area where the user data was recorded is regarded as an unrecorded area, and dummy data having predetermined data (=data attribute) is recorded on the unrecorded area as shown in FIG. 4H. In this example, since user data are not recorded on the data area of the layer 1 at all, the area from the start address Y' to the address B' of the data area of a layer 1 is recorded by the dummy data of a data attribute as a predetermined non-recorded area. At this time, lead-out data may be recorded on the lead-out area (from the address B' to the address A'). Therefore, an area from the address A to the address B is the lead-in area, an area from the address B to the address Y is the data area of the layer 0, an area from the address Y to the address E is the middle area of the layer 0, an area from the address E' to the address Y' is the middle area of the layer 1, an area from the address Y' to the address B' is the data area of the layer 1, and an area of the address B' to the address A' is the lead-out area. Consequently, it becomes the same disc layout as a single-sided dual-layer reproduction-only DVD-ROM. Therefore, even when user data recording is completed in the middle of the data area of the first layer, the compatibility with the single-sided dual-layer reproduction-only DVD-ROM can be maintained without problems.

A description will now be given, with reference to a flowchart of FIG. 5, of an information recording process performed by the CPU 13 when predetermined data (=lead out) is recorded on the unrecorded area as shown in FIGS. 3C, 3D, 3F, 3G and 3H, and FIGS. 4C, 4D, 4F, 4G and 4H. It should be noted that in the following description, the addresses shown in FIGS. 3A through 3H and FIGS. 4A through 4H are used. That is, when the dual-layer DVD+R to be used is base on the PTP method, in both the layer 0 and the layer 1, a lead-in start address=A, a data area start address=B, a lead-out start address=C and a lead-out end address=D. Additionally, when the dual-layer DVD+R to be used is based on the OTP method, the lead-in start address=A, the data area start address of the layer 0=B, the middle area start address of the layer 0=C, the middle area end address of the layer 0=D, the middle area start address of the layer 1=D', the data area start address of the layer 1=C', the lead-out start address=B', and the lead-out end address=A'. Here, the sign "'" indicates a bit-inverted value.

The process is performed as one of processes when a recording request is made by a user through the host (Y of step S1). After recording corresponding to the request addresses is performed (step S2), it is determined whether or not there is another recording request (step S3). If there is another recording request of data (Y of step S3), the data recording requested is performed continuously (step S2). On the other hand, if the user data recording is completed (N of step S3), a physical address X at which the user data recording is completed is acquired (step S4). The process of N of step S3 and step S4 is performed as address information acquisition means or an address information acquisition function to acquire a recording completion address information at the time of completion of the data recording.

After acquiring the user data recording completion address X as mentioned above, it is determined whether or not the dual-layer DVD+R (optical disc 2) inserted is a disc according to the PTP method or a disc according to the OTP disc (step S5). Since the difference between the two methods is recorded in a predetermined area of the optical disc 2, the determination can be made based on the information. If the DVD+R is a disc according to the OTP method (Y of S5), it is determined whether or not the user data recording completion address X is an address within the layer 0 (step S6). If the address X is an address in the layer 0 (Y of step S6), the lead-out recording start address Y is equal to the inverted address X (Y=X') (step S7). On the other hand, if the address X is an address in the layer 1 (N of step S6), the lead-out recording start address Y is equal to the address X (Y=X) (step S8). Then, the lead-out recording end address Z=A' is acquired (step S9). The process of steps S6–S9 is performed as unrecorded area recognition means or an unrecorded area recognition function to recognize a range of the unrecorded area. Thereafter, lead-out data is recorded on the unrecorded area which is an area from the address Y to the address Z (step S10), and the process is ended (step S11). The process of step S10 is performed as recording processing means or a recording processing function.

On the other hand, when the dual-layer DVD+R inserted is a disc according to the PTP method (N of step S5), it is determined whether or not the user data recording completion address X is an address within the layer 0 (step S12). If the address X is an address within the layer 0 (Y of step S12), the lead-out recording start address Y is equal to B (Y=B) (step S13). If the address X is an address within the layer 1 (N of S12), the lead-out recording start address Y is equal to X (Y=X) (step S14). Then, the lead-out recording end address Z=D is acquired (step S15). The above-mentioned process of steps S12 through S15 is performed as unrecorded area recognition means or an unrecorded area recognition function to recognize a range of the unrecorded area in the layer 1. Thereafter lead-out is recorded on an area between the address Y and the address Z as the unrecorded area (step S10), and the process is ended (step S11). The process of step S10 is performed as recording processing means or a recording processing function. Moreover, the process of the above-mentioned steps S3 through step S10 is performed as unrecorded area data embedding means or an unrecorded area data embedding process.

Figure 5:
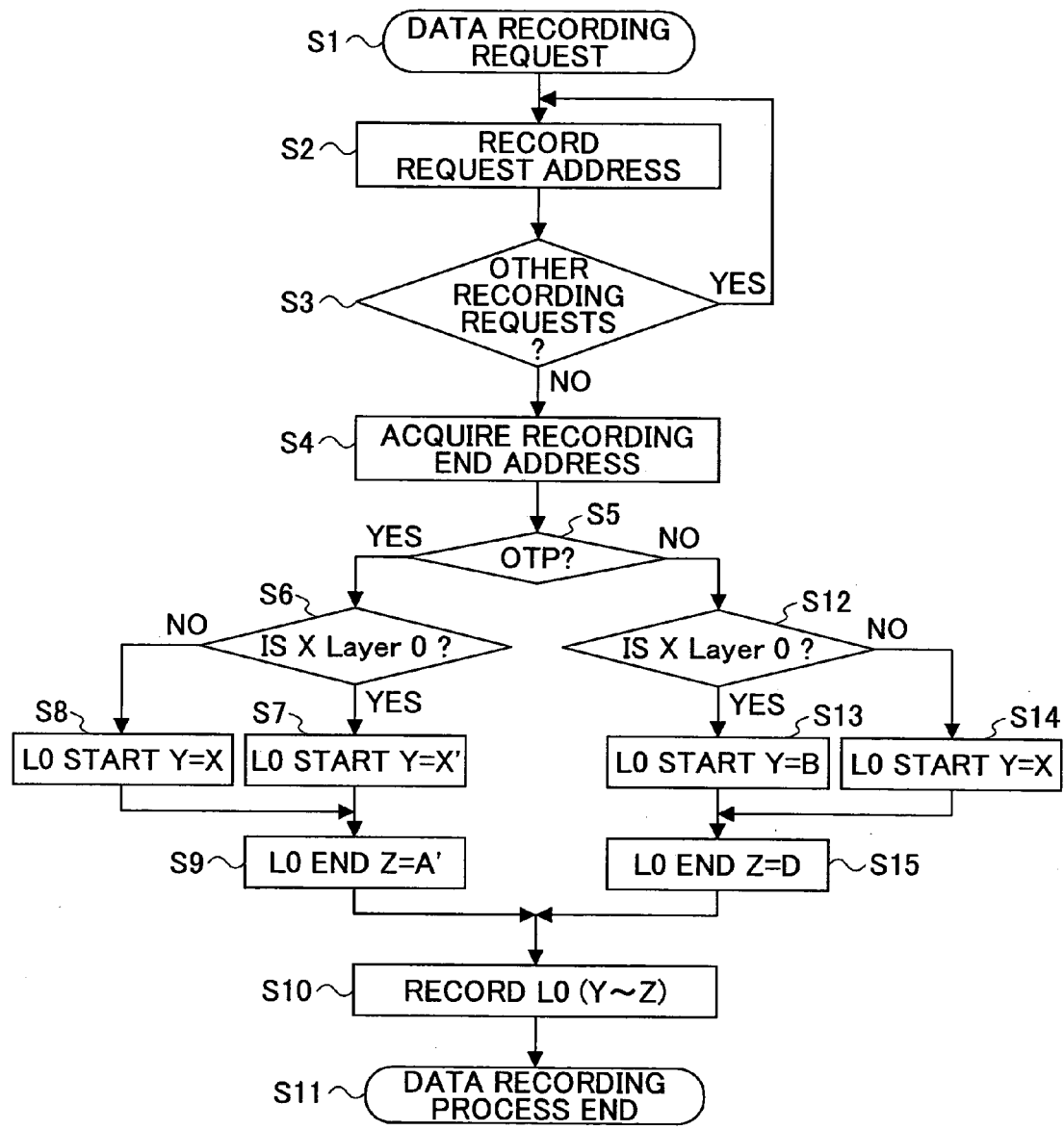
FIG. 5 is a flowchart of a recording process when predetermined data is used as a lead-out.

It should be noted that, although there is no descriptions provided with respect to the recording of the lead-in area and the lead-out area or the middle area in the layer 0 in the process shown in FIG. 5, the recording may be performed on a predetermined area after the time of completion of the user data recording until ejection of the optical disc 2. Moreover, if the address X is an address within the layer 0, that is, if user data is not recorded at all in the layer 1, the lead-out may be recorded after the dummy data having user data attribute is recorded on a part of the unrecorded area as mentioned above.

Figure 6:
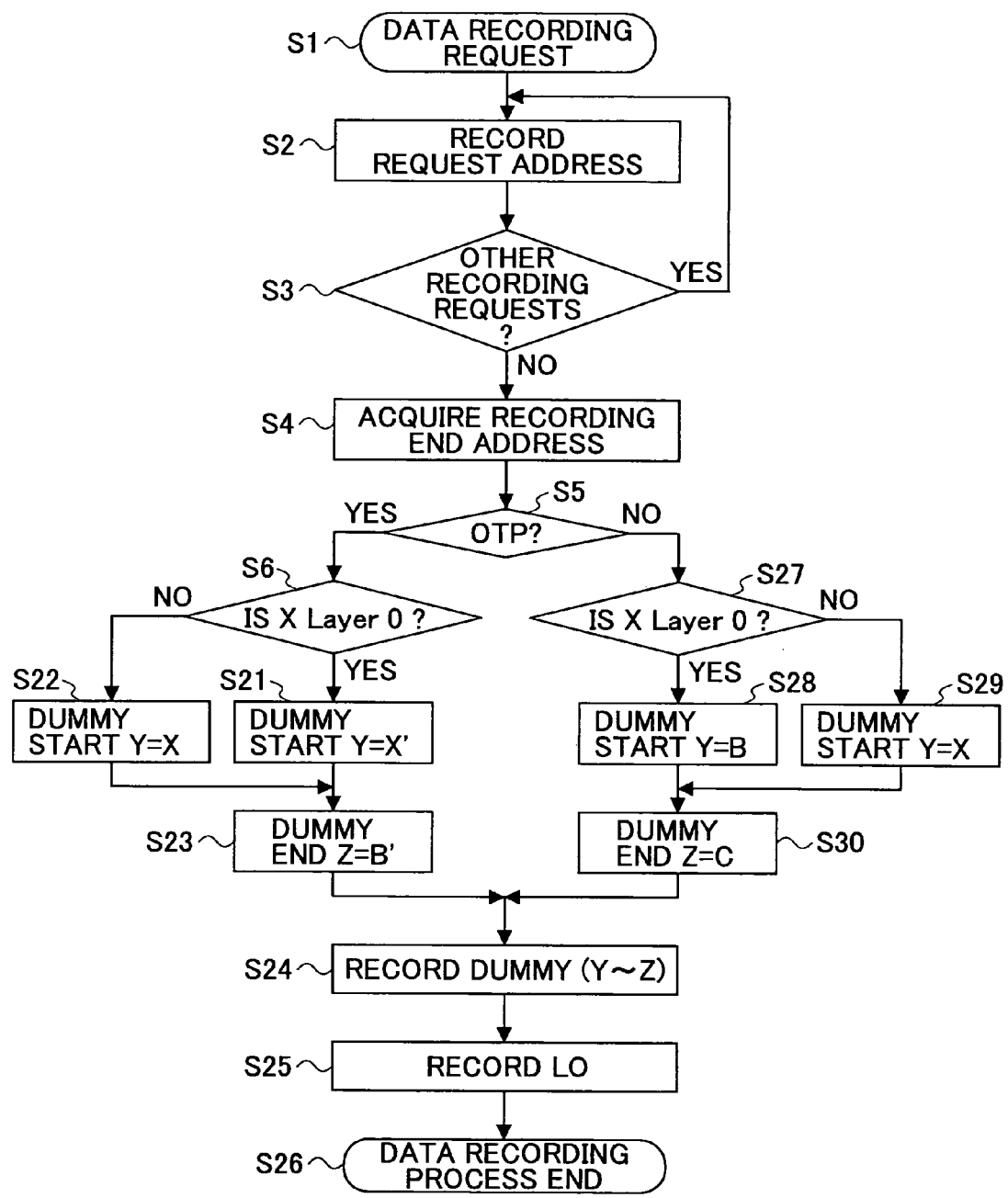
FIG. 6 is a flowchart of the record process when a predetermined data is used as dummy data.

A description will now be given, with reference to a flowchart of FIG. 6, of an information recording process performed by the CPU 13 when predetermined data (=dummy data having data attribute) is recorded on the unrecorded area as shown in FIGS. 3C, 3D, 3F, 3G and 3H, and FIGS. 4C, 4D, 4F, 4G and 4H. It should be noted that in the following description, the addresses shown in FIGS. 3A through 3H and FIGS. 4A through 4H are used.

The process of steps S1–S5 is the same as the process shown in FIG. 5. If the DVD+R is a disc according to the OTP method (Y of S5), it is determined whether or not the user data recording completion address X is an address within the layer 0 (step S6). If the address X is an address in the layer 0 (Y of step S6), the dummy data recording start address Y is equal to the inverted address X (Y=X') (step S21). On the other hand, if the address X is an address in the layer 1 (N of step S6), the dummy data recording start address Y is equal to the address X (Y=X) (step S22). Then, the dummy recording end address Z=B' is acquired (step S23). The process of steps S6, S21–S23 is performed as unrecorded area recognition means or an unrecorded area recognition function to recognize a range of the unrecorded area. Thereafter, the dummy data is recorded on the unrecorded area which is an area between the address Y and the address Z (step S24), and lead-out data is recorded in the lead-out area (step S25), and the process is ended (step S26). The process of step S24 is performed as recording processing means or a recording processing function.

On the other hand, when the dual-layer DVD+R inserted is a disc according to the PTP method (N of step S5), it is determined whether or not the user data recording completion address X is an address within the layer 0 (step S27). If the address X is an address within the layer 0 (Y of step S27), the dummy data recording start address Y is equal to B (Y=B) (step S28). If the address X is an address within the layer 1 (N of S27), the dummy data recording start address Y is equal to X (Y=X) (step S29). Then, the dummy data recording end address Z=C is acquired (step S30). The above-mentioned process of steps S27 through S30 is performed as unrecorded area recognition means or an unrecorded area recognition function to recognize a range of the unrecorded area in the layer 1. Thereafter, the dummy data is recorded on an area between the address Y and the address Z as the unrecorded area (step S24), and the lead-out is recorded in the lead-out area (step S25), and the process is ended (step S26). The process of step S24 is performed as recording processing means or a recording processing function. Moreover, the process of the above-mentioned steps S3 through step S25 is performed as unrecorded area data embedding means or an unrecorded area data embedding process.

It should be noted that, although there is no descriptions provided with respect to the recording of the lead-in area and the lead-out area or the middle area in the layer 0, the recording may be performed on a predetermined area after the time of completion of the user data recording until ejection of the optical disc 2.

In addition, although the second layer is a single layer in the above-mentioned embodiments, the information recording method according to the present invention is applicable to a recording layer having a second layer containing a plurality of recording layers.

Moreover, although the information recording medium is a dual-layer DVD+R in the above-mentioned embodiments, the present invention is not limited to the dual-layer DVD+R.

That is, the present invention is applicable similarly to an information recording medium, which has a plurality of recording layers each having a data area for recording user data, the recording layers including a first recording layer and a second recording layer other than the first recording layer, the first recording layer being a reference to determine a position and a range of the data area of each of the recording layer.

The above-mentioned information record method may be stored in the ROM 12 as a computer executable program, and is executed by the CPU 13. Moreover, such a program may be recorded on the optical disc 2, and is read and stored in the RAM 14 so as to be executed by the CPU 13.

The present invention is not limited to the specifically disclosed embodiments, and variations and modifications may be made without departing from the scope of the present invention.

What is claimed is:

1. An information recording method for recording information on an information recording medium having a plurality of recording layers including at least a first layer and a second layer each having a data area for recording user data, the information recording medium being recordable according to an opposite track path method, the information recording method comprising:
    recording lead-out data, when the a recording completion position of said user data is within said first layer, in an area from a position of said second layer corresponding to the same radial position with said recording completion position to an inner side; and
    recording a middle area immediately after said recording completion position, when the recording completion position is determined to be within said first layer.

2. The information recording method as claimed in claim 1, wherein said information recording medium is a write-once-read-many optical disc.

3. The information recording method as claimed in claim 1, wherein said information recording medium is a rewritable optical disc.

4. An information recording apparatus configured and arranged to record information on an information recording medium having a plurality of recording layers including at least a first layer and a second layer each having a data area for recording user data, the information recording medium being recordable according to an opposite track path method, the information recording apparatus comprising:
    recording means for recording lead-out data, when a recording completion position of said user data is within said first layer, in an area from a position of said second layer corresponding to the same radial position with said recording completion position to an inner side; and
    recording means for recording a middle area immediately after said recording completion position, when the recording completion position is within said first layer.

5. The information recording apparatus as claimed in claim 4, wherein said information recording medium is a write-once-read-many optical disc.

6. The information recording apparatus as claimed in claim 4, wherein said information recording medium is a rewritable optical disc.

7. A computer readable medium storing an information recording program to be installed in an information recording apparatus configured and arranged to record information on an information recording medium having a plurality of recording layers including at least a first layer and a second layer each having a data area for recording user data, the information recording medium being recordable according to an opposite track path method, the information recording program causing said computer to perform:
    a recording function to record lead-out data, when a recording completion position of said user data is within said first layer, in an area from a position of said second layer corresponding to the same radial position with said recording completion position to an inner side; and a recording function to record a middle area immediately after said recording completion position, when the recording completion position is within said first layer.

8. The computer readable medium as claimed in claim 7, wherein said information recording medium is a write-once-read-many optical disc.

9. The computer readable medium as claimed in claim 7, wherein said information recording medium is a rewritable optical disc.

10. An information recording method for recording information on an information recording medium having a plurality of recording layers including at least a first layer and a second layer each having a recording area for recording user data, the information medium being recordable according to an opposite track path method, the information recording method comprising:

recording lead-out data, when a recording completion position at which recording of the user data is determined to be within said first layer, in an area from a position of said second layer corresponding to the same radial position with said recording completion position to an inner side; and recording a middle area immediately after said recording completion position, when the position is determined to be within said first layer.

11. An information recording method for recording information on an information recording medium having a plurality of recording layers including at least a first layer and a second layer each having a recording area for recording user data, the information medium being recordable according to an opposite track path method, the information recording method comprising:

recording lead-out data, when a recording completion address at which recording of the user data is determined to be within said first layer, in an area from an address of said second layer having a bit-inverted address with said recording completion address to an inner side; and recording a middle area immediately after said recording completion address, when the recording completion address is determine to be within said first layer.

12. An information recording apparatus configured and arranged to record information on an information recording medium having a plurality of recording layers including at least a first layer and a second layer each having a data area for recording user data, the information recording medium being recordable according to an opposite track path method, the information recording apparatus comprising:

a lead-out data recorder, said lead-out data recorder adapted to record lead-out data, when a recording completion position of the user data is determined to be within said first layer, in an area from a position of said second layer corresponding to the same radial position with said recording completion position to an inner side; and a middle area recorder, said middle area recorder adapted to record a middle area immediately after said recording completion position, when the recording completion position is determined to be within said first layer.

13. An information recording apparatus configured and arranged to record information on an information recording medium having a plurality of recording layers including at least a first layer and a second layer each having a data area for recording user data, the information recording medium being recordable according to an opposite track path method, the information recording apparatus comprising:

a lead-out data recorder, said lead-out data recorder adapted to record lead-out data, when a recording completion address of the user data is determined to be within said first layer, in an area from an address of said second layer having a bit-inverted address with said recording completion address to an inner side; and a middle area recorder, said middle area recorder adapted to record a middle area immediately after said recording completion address, when the recording completion address is determined to be within said first layer.

* * * * *